(12) United States Patent
Dolgin et al.

(10) Patent No.: US 10,374,743 B2
(45) Date of Patent: Aug. 6, 2019

(54) SYSTEMS AND METHODS FOR DEMODULATION OF WAVE DIVISION MULTIPLEXED OPTICAL SIGNALS

(71) Applicant: RAYTHEON COMPANY, Waltham, MA (US)

(72) Inventors: Benjamin P. Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/156,065

(22) Filed: Oct. 10, 2018

(65) Prior Publication Data

US 2019/0158208 A1 May 23, 2019

Related U.S. Application Data

(60) Provisional application No. 62/587,696, filed on Nov. 17, 2017.

(51) Int. Cl.
*H04B 10/00* (2013.01)
*H04J 14/02* (2006.01)
(Continued)

(52) U.S. Cl.
CPC .......... *H04J 14/0227* (2013.01); *H04B 10/66* (2013.01); *H04B 10/677* (2013.01); *H04J 14/0221* (2013.01)

(58) Field of Classification Search
CPC ........ G02F 2/00; H04B 10/676; H04B 10/677
See application file for complete search history.

(56) References Cited

U.S. PATENT DOCUMENTS

| 7,245,833 B1 * | 7/2007 | Volkening .......... H04B 10/2575 398/116 |
| 8,411,351 B2 | 4/2013 | McCallion et al. |

(Continued)

FOREIGN PATENT DOCUMENTS

| JP | H0591047 A | 4/1993 | |
| WO | 2018064139 A1 | 4/2018 | |
| WO | WO-2018064139 A1 * | 4/2018 | ............... G02B 5/28 |

OTHER PUBLICATIONS

Zhang, L. et al. "Microring-based Modulation and Demodulation of DPSK Signal" Optical Society of America, Optics Express, vol. 15, No. 18, Sep. 3, 2007.

(Continued)

*Primary Examiner* — Daniel G Dobson
(74) *Attorney, Agent, or Firm* — Lando & Anastasi, LLP (57) ABSTRACT

Optical signal receivers and methods are provided that include an optical resonator that allows optical signal energy of multiple wavelengths to enter and accumulate inside the optical resonator. A portion of optical signal energy of each wavelength is emitted from the optical resonator at an output, and the individual wavelengths may be separated. A detector aligned with the output detects the emitted optical signal energy of at least one of the wavelengths. The detector is configured to detect disturbances to the emitted optical signal energy and determine a modulated characteristic in the received optical signal energy of the wavelength.

20 Claims, 8 Drawing Sheets

(51) Int. Cl.
*H04B 10/66* (2013.01)
*H04B 10/67* (2013.01)
*H04J 14/00* (2006.01)

(56) References Cited

U.S. PATENT DOCUMENTS

| | | | |
|---|---|---|---|
| 9,973,281 | B2 | 5/2018 | Kowalevicz et al. |
| 10,164,765 | B2 | 12/2018 | Dolgin et al. |
| 10,177,856 | B2 | 1/2019 | Kowalevicz et al. |
| 2006/0013591 | A1 | 1/2006 | Rohde |
| 2007/0031150 | A1 | 2/2007 | Fisher et al. |
| 2007/0216988 | A1* | 9/2007 | Caplan ............ H04B 10/677 359/325 |
| 2008/0226300 | A1* | 9/2008 | Mayer ............ H04B 10/677 398/158 |
| 2008/0240736 | A1 | 10/2008 | Ji et al. |
| 2008/0266573 | A1 | 10/2008 | Choi et al. |
| 2011/0097085 | A1 | 4/2011 | Oda et al. |
| 2012/0121271 | A1 | 5/2012 | Wood |
| 2013/0272337 | A1 | 10/2013 | Tan et al. |
| 2014/0314406 | A1 | 10/2014 | Zerbe et al. |
| 2016/0013870 | A1 | 1/2016 | Sorin et al. |
| 2016/0072586 | A1* | 3/2016 | Hochberg ............ H04B 10/40 398/136 |
| 2018/0054259 | A1 | 2/2018 | Kowalevicz et al. |
| 2018/0091227 | A1 | 3/2018 | Dolgin et al. |
| 2018/0091228 | A1 | 3/2018 | Kowalevicz et al. |
| 2018/0091230 | A1 | 3/2018 | Dolgin et al. |
| 2018/0091232 | A1 | 3/2018 | Dolgin et al. |
| 2018/0102853 | A1 | 4/2018 | Dolgin et al. |
| 2018/0145764 | A1 | 5/2018 | Dolgin et al. |
| 2018/0145765 | A1 | 5/2018 | Kowalevicz et al. |
| 2018/0167145 | A1 | 6/2018 | Dolgin et al. |
| 2018/0234231 | A1 | 8/2018 | Dolgin et al. |
| 2018/0313642 | A1 | 11/2018 | Dolgin et al. |
| 2018/0367223 | A1 | 12/2018 | Graceffo et al. |
| 2019/0007091 | A1 | 1/2019 | Graceffo et al. |

OTHER PUBLICATIONS

Arimoto et al., "High-speed free-space laser communication", Performance and Management of Complex Communications Networks, 1998, pp. 175-190.

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: <http://www.dtic.mil/cgi-bin/GetTRDoc?Location=U2&doc=GetTRDoc.pdf&AD=ADA565323» and accessed on Nov. 17, 2017.

Juarez et al., "High-sensitivity DPSK receiver for high-bandwidth free-space optical communication links", Optics Express, vol. 19, May 2011, pp. 1-8.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

International Search Report and Written Opinion in application No. PCT/US2018/055200 dated Jan. 31, 2019.

\* cited by examiner

SYSTEMS AND METHODS FOR DEMODULATION OF WAVE DIVISION MULTIPLEXED OPTICAL SIGNALS

CROSS-REFERENCE TO RELATED APPLICATIONS

This application claims the benefits under 35 U.S.C. § 119(e) and PCT Article 8 of U.S. Provisional Patent Application No. 62/587,696 titled "SYSTEMS AND METHOD FOR DEMODULATION OF WAVE DIVISION MULTIPLEXED OPTICAL SIGNALS" and filed on Nov. 17, 2017, which is herein incorporated by reference in its entirety for all purposes.

BACKGROUND

Many optical signals include phase modulation formats, as well as amplitude and other modulation formats, and phase modulation formats have particular advantages. Information encoded in phase modulation may include transmitted communication data, or may include other information such as information about the source of the optical signal, interaction of the optical signal with an object, the optical channel through which the optical signal traveled, and/or objects with which it interacted. Compared to typical amplitude modulation receivers, phase modulation receivers can be significantly more complex, requiring precision optics, local oscillators, gratings (such as Fiber Bragg Gratings), and/or delay line interferometers (DLI), etc. Generally, a phase modulation receiver collects a phase-encoded optical signal and performs one or more demodulation processes to convert the phase modulation into useful information. In systems that employ wavelength division multiplexing (WDM), including dense wavelength division multiplexing (DWDM), multiple optical signals are conveyed simultaneously on differing wavelengths. WDM receiver systems for phase modulated optical signals may therefore be increasingly more complex, requiring multiple complex phase receivers to receive the multiple wavelengths.

SUMMARY

Aspects and examples described herein provide systems and methods for simultaneous detection and demodulation of multiple optical signals, e.g., having differing wavelengths, without the necessity for a locally coherent clock source. In particular, certain examples of the system include a receiver having an optical resonator, such as a Fabry-Perot filter/resonator, for converting multiple received optical wavelengths, which may include phase-encoded information, into intensity-encoded optical wavelengths. The individual wavelengths may be separated, and the individual intensity-encoded optical signals may be provided to a receiver. The optical resonator may be tuned to match a set of wavelengths for a (collection of) WDM optical signals, and function over a broad range of modulation rates across the various wavelengths, without the need to modify the characteristics of the receiver. Additionally, one or more optical resonators may be employed to pass amplitude and other variations from the received signal, converting them into intensity-encoded output signals and thereby allowing detection and reception of higher order phase modulation schemes, amplitude modulation, and/or frequency modulation. Accordingly, the systems and methods disclosed herein may provide the flexibility to accommodate various encoding techniques and various modulation rates (e.g., baud rates) on each of multiple wavelengths.

According to one embodiment, an optical signal receiver comprises an optical resonator having an aperture to allow optical signal energy to enter and an output to allow a portion of optical signal energy to be emitted, the optical resonator configured to receive optical signal energy of a plurality of wavelengths via the aperture, accumulate resonant optical signal energy inside the optical resonator, cause the emitted optical signal energy at each of the plurality of wavelengths to approach a steady-state output intensity, and disturb the emitted optical signal energy of a respective wavelength upon a transition in the received optical signal energy of the respective wavelength, the optical resonator having at least one dimension to cause phase alignment of the accumulated optical signal energy at each of the plurality of wavelengths. The optical signal receiver further comprises an optical splitter configured to receive the emitted optical signal energy and separate the emitted optical signal energy into each of the plurality of wavelengths, and a detector configured to receive at least one of the plurality of wavelengths and to detect the disturbance to the emitted optical signal energy and determine a characteristic of the transition in the received optical signal energy based upon the disturbance.

In one example the optical resonator is further configured to disturb the emitted optical signal energy based upon a phase variation in the received optical signal energy. In another example the disturbance is a variation in intensity of the emitted optical signal energy and the detector is further configured to detect the variation and to determine a phase transition in the received optical signal energy based upon the variation. In one example the optical resonator is an etalon having two semi-reflective surfaces configured to at least partially trap optical signal energy by reflecting a portion of optical signal energy impinging upon each of the semi-reflective surfaces. In another example the optical resonator includes first and second reflective surfaces, substantially parallel with each other, with reflective sides facing each other, the first reflective surface forming at least a portion of the aperture and being partially transmissive to optical signal energy arriving from outside the optical resonator to allow optical signal energy into the optical resonator, the second reflective surface forming at least a portion of the output and being substantially reflective but partially transmissive to optical signal energy inside the optical resonator to allow the portion of the optical signal energy inside the optical resonator to be emitted outside the optical resonator. The optical signal receiver may further comprise an optical-electrical converter configured to convert the emitted optical signal energy into an electrical signal, the electrical signal having an amplitude indicative of an intensity of the emitted optical signal energy, and the detector configured to detect the disturbance to the emitted optical signal energy by processing the electrical signal.

According to another embodiment a method of detecting information encoded in an optical signal comprises receiving optical signal energy of a plurality of wavelengths, accumulating the optical signal energy in an optical resonator that approaches a steady state of accumulated optical signal energy, outputting optical signal energy from the accumulated optical signal energy, the intensity of the output optical signal energy at a respective wavelength of the plurality of wavelengths being proportional to the accumulated optical signal energy of the respective wavelength, detecting the output optical signal energy of at least one of the plurality of wavelengths, and determining a modulation characteristic of the received optical signal energy based on the detected output optical signal energy.

In one example determining a modulation characteristic of the received optical signal energy based on the detected output optical signal energy includes determining a phase variation in the received optical signal energy based on an intensity variation in the output optical signal energy. The method may further comprise varying the accumulated optical signal energy in the optical resonator by one of destructive interference or constructive interference within the optical resonator in response to the modulation characteristic of the received optical signal energy. In one example the modulation characteristic of the received optical signal energy is a phase transition associated with the respective wavelength. In another example accumulating the optical signal energy in an optical resonator includes partially reflecting the optical signal energy between two semi-reflective surfaces. The method may further comprise converting the output optical signal energy into an electrical signal, the amplitude of the electrical signal being representative of the intensity of the output optical signal energy. In one example determining a modulation characteristic of the received optical signal energy based on the detected output optical signal energy includes providing the electrical signal to a receiver.

According to another embodiment an optical receiver comprises an etalon configured to at least partially accumulate optical signal energy of a plurality of wavelengths between two semi-reflective surfaces and having an aperture to allow optical signal energy to enter and an output to allow a portion of the accumulated optical signal energy to be emitted, the etalon configured to cause the output optical signal energy to temporarily vary in intensity based upon a phase transition in the entering optical signal energy, an optical-electrical converter configured to receive at least one wavelength of the output optical signal energy and to convert the received output optical signal energy into an electrical signal, and a receiver configured to receive the electrical signal and to determine encoded information based in part on the electrical signal.

In one example the optical receiver further comprises an analog to digital converter configured to convert the electrical signal from an analog form to a digital form, the receiver configured to receive the digital form of the electrical signal. In another example the optical receiver further comprises an optical splitter configured to receive the output optical signal energy and separate the output optical signal energy into each of the plurality of wavelengths. In one example the optical splitter is an arrayed waveguide grating. In another example the etalon is configured to have a nominal dimension selected to cause the etalon to at least partially accumulate optical signal energy of the plurality of wavelengths. In another example the etalon is configured to have a nominal dimension selected to cause the accumulation of optical signal energy to occur at a particular rate to accommodate an expected data rate associated with the encoded information. The optical receiver may further comprise optics configured to collect optical signal energy and provide the optical signal energy to the etalon.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Various aspects and embodiments are directed to improved systems and methods for demodulation of phase-encoded (i.e., phase modulated) optical signals. In certain examples, the system includes an optical resonator, such as a Fabry-Perot filter/resonator or a micro-ring, which simultaneously converts phase-encoded optical signals of multiple wavelengths into directly detectable intensity modulated output signals.

Phase encoded optical signals may come from numerous sources and/or be generated by numerous processes. Detection of the phase encoding may therefore be useful for many purposes. A coherent optical signal, such as a laser beam, may be purposefully modulated by a data communications transmitter for instance, to encode communicated information on the optical signal. Other information, such as timing and/or time stamp information, may be purposefully encoded as a phase modulation. Numerous processes may phase modulate a coherent light source, and from which information about the process may be recovered by appropriate demodulation (e.g., interpreting) of the phase modulated optical signal. For example, various measurement systems may transmit an optical signal and analyze a reflected signal to determine dimensions, movement, defects, etc. Examples of various systems for which demodulation of phase modulated optical signals may be beneficial include target designators, laser guidance systems, laser sight, laser scanners, 3D scanners, homing beacons and/or surveying systems, as well as communication systems. In various of these examples, an optical signal may arrive via a free space signal path (e.g., free space optical, FSO) or a fiber or other waveguide system. Systems and method for demodulation of phase modulated optical signals in accord with aspects and examples disclosed herein may be beneficially applied to any of the above example optical systems, or others, to receive, detect, recover, etc. useful information from an optical signal having phase encoding.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Many optical communication receivers (e.g., coherent receivers) require a stable clock in order to accurately perform demodulation processes for a received signal, and may also require sophisticated optics such as 90-degree hybrids, phase shifters, and the like, especially when modulation includes encoding of information in polarization of the optical signal. In contrast, optical receivers in accord with the aspects and examples disclosed herein do not require a local coherent clock source nor significant optical components to achieve the same receiver capabilities as a conventional optical receiver. The benefits are achieved, at least in part, by an optical front-end that includes an optical resonator capable of detecting modulation transitions, such as phase variations, in an optical signal without a coherent reference source. The optical front-end further transforms the modulation, e.g., phase modulation, into an intensity modulation that allows simplified processing, potentially in the electrical domain.

Figure 1:
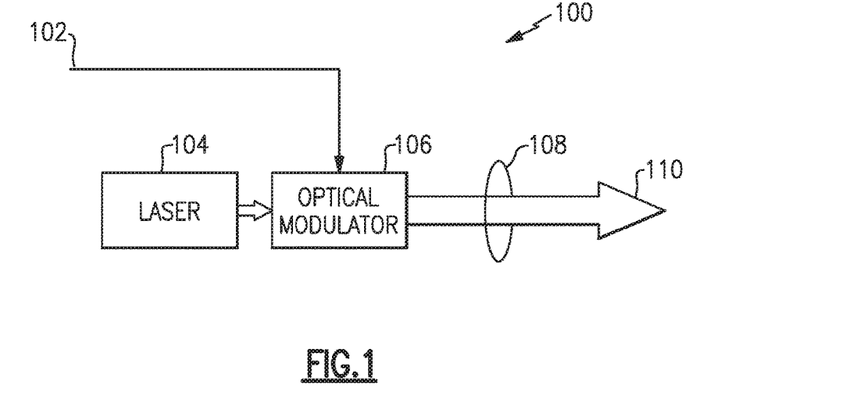
FIG. 1 is a block diagram of a notional optical transmitter for use with various examples described herein.
Figure 2:
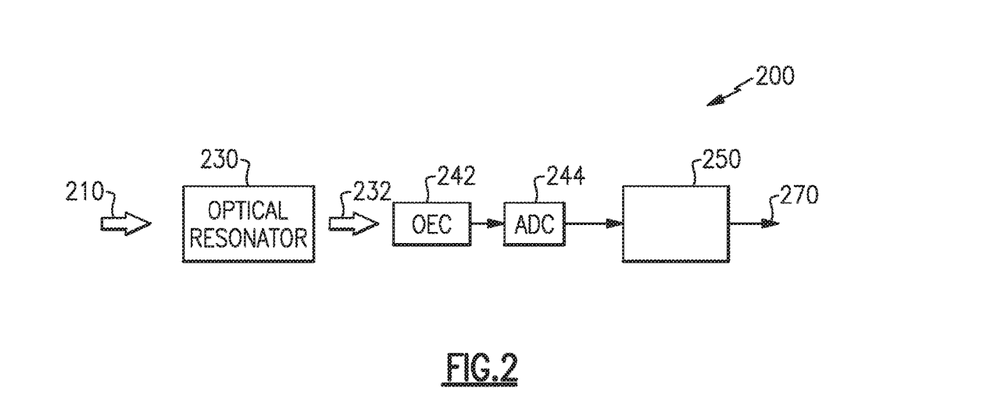
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 shown in FIG. 1 and the optical receiver 200 shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, an optical source (e.g., a laser) 104, a modulator 106, and optics 108, and an output 110 to provide an optical signal output. The modulator 106 imposes a modulation scheme on the optical source 104 to generate a modulated optical signal. In various examples, the modulator 106 may be an electro-optic modulator, and may include the optical source 104, such as a laser. In particular, the optical source 104 may emit a continuous carrier waveform that is modulated (e.g., in phase, amplitude, and/or frequency) for each symbol of the data payload to encode those symbols on the carrier waveform. The transmitter 100 may also include various optics 108 such as one or more mirrors or lenses to direct the optical signal at the output 110.

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. Additionally, a receiver and a transmitter may be paired together, e.g., to form a transceiver, capable of bidirectional data communication with another transmitter/receiver pair.

The illustrated receiver 200 receives an optical signal 210 and includes an optical resonator 230 and a digital processing subsystem 250 that provides an output 270. The optical resonator 230 may be coupled to the digital processing subsystem 250 by an optical-electrical converter 242 and an analog to digital converter 244, for example.

Examples of optical resonators 230 may include Fabry-Perot etalons, micro-rings, or other types of resonators. The optical resonator 230 is a component capable of sensing transitions, such as phase variations, representative of modulation performed at the transmitter, and transforming the transitions into intensity modulation of an output optical signal, e.g., output optical signal 232. The optical resonator 230 converts the modulation of the arriving optical signal 210 in part by interaction of the arriving optical signal 210 with resonant optical energy built-up in the optical resonator 230.

For example, an etalon is a component having a pair of parallel semi-reflective surfaces, that may include a transparent material in between, and has one or more characteristic resonant frequencies, each associated with a certain wavelength of light, based upon the spacing (i.e., dimensional length) between the semi-reflective surfaces. The surfaces are semi-reflective and also semi-transmissive, in that they allow some light through, and therefore the arriving optical signal 210 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 232 in FIG. 2.

An optical signal received by an optical resonator 230, an etalon in this example, may establish a steady-state energy-conserving condition in which optical signal energy continuously arrives at the etalon, accumulates or adds to built-up resonating energy existing inside the etalon, and emerges from the etalon at a constant rate. A change in the arriving phase, frequency, or amplitude of the optical signal may disrupt the resonance inside the etalon, and the light intensity emerging from the etalon is also disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Similar operation occurs in a micro-ring or other optical resonator, and accordingly an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232, and may be converted to a digital form by an analog to digital converter, e.g., ADC 244. The digital signal is provided to the digital processing subsystem 250 for digital processing. The digital processing subsystem 250 processes the digital signal to receive the information-carrying content of the optical signal 210.

In various examples, a receiver in accord with aspects and examples disclosed herein may include additional or fewer optics than discussed above, and may omit or add various components relative to those discussed above. For example, focusing optics may be included to receive the emerging optical signal 232 from the optical resonator 230 and to focus the optical signal 232 on the OEC 242. Certain examples may use analog receiver circuitry and therefore may omit one or more of the ADCs 224. Various examples may include a channel estimator as part of the digital processing subsystem 250 to provide phase rotation or other signal adjustments as may be known in the art.

As discussed above, suitable optical resonators may include etalons, micro-rings, or other structures. Some detail of at least one example of an etalon is discussed below with respect to FIG. 3. A micro-ring is a resonator formed of one or more waveguides in which at least one is a closed loop such that optical signal energy traversing "around" the loop may be phase aligned with a dimension of the loop at one or more frequencies. Accordingly, optical signal energy traversing the loop may constructively interfere with itself, at certain frequencies, to sustain the optical signal energy within the loop. At other frequencies, optical signal energy traversing the loop will destructively interfere with itself thereby destroying, or rejecting, a build-up of optical signal energy at that frequency. The closed loop is also coupled to some type of input and output, to allow light to enter the loop, e.g., an aperture, and to let light out of the loop.

Figure 3:
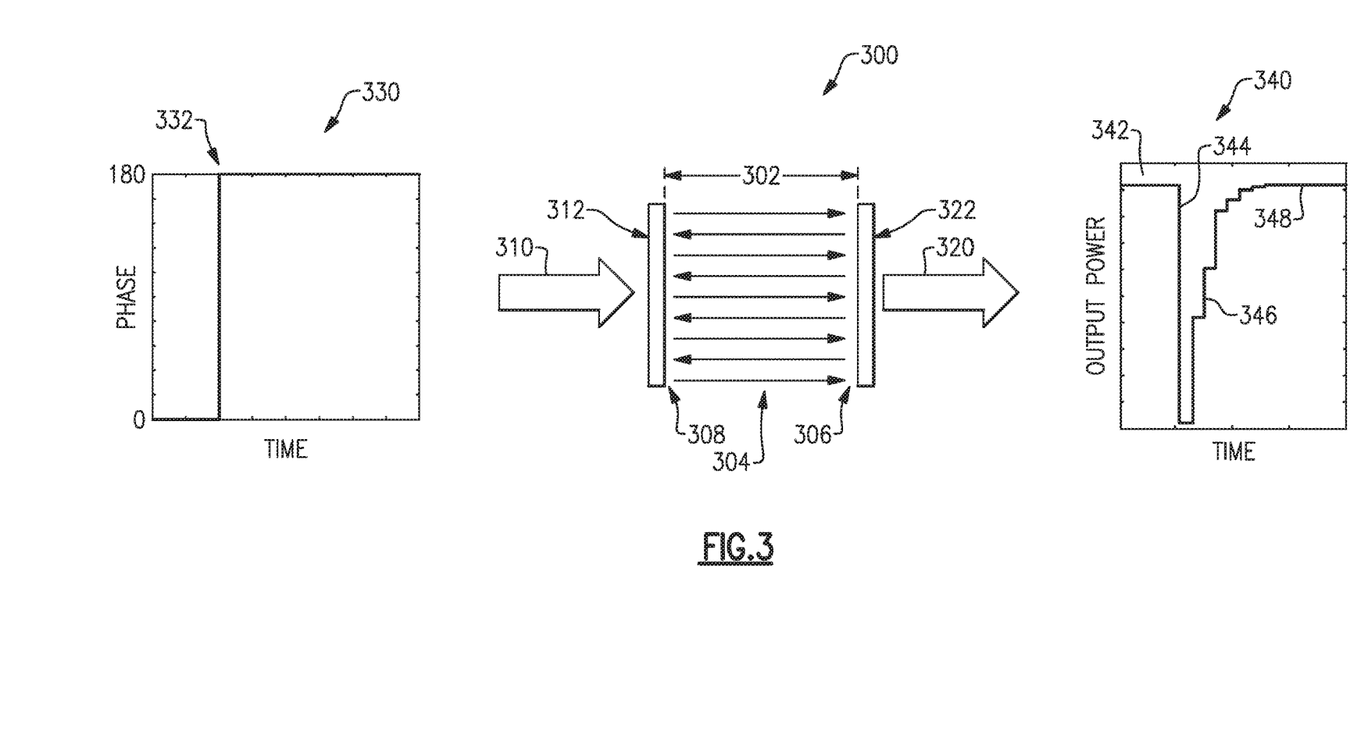
FIG. 3 is a schematic diagram of an example of an optical resonator, including a graph of received signal phase and a graph of output intensity of the optical resonator.

FIG. 3 illustrates an example of an etalon 300 which may be used in various examples of a receiver in accord with aspects and embodiments described herein, for example, as the optical resonator 230 in FIG. 2. In particular, a receiver may use the etalon 300 to convert phase modulations of a received optical communication signal 310 into intensity or amplitude modulations of an output optical signal 320. The intensity or amplitude modulated output optical signal 320 may then be converted to an electrical signal, with corresponding amplitude variations representative of the phase modulation of the received optical signal 310. The etalon 300 causes the received optical signal 310 to resonantly interact with itself, internal to the etalon 300, such that phase changes in the received optical signal 310 disrupt the resonance and cause amplitude (or intensity) variations at the output optical signal 320, which may be coupled directly to a detector.

In particular examples, the etalon 300 is designed to have a resonant frequency aligned with the source, e.g., a transmit laser, of the received optical communication signal 310. In various examples, a dimensional scale, e.g., length 302, of the etalon 300 is selected such that the etalon 300 exhibits optical resonance at the wavelength of the received optical communication signal 310. In certain examples, such dimensional scales are much shorter than the length of a transmitted symbol, which is the distance traveled by the optical signal between transitions that convey information, e.g., between phase changes in a phase modulated signal.

The etalon 300 includes an interior 304 with semi-reflective surfaces 306, 308 that reflect optical signal energy into the interior 304. An input side 312 allows optical signal energy, such as the optical communication signal 310, into the interior 304. The input side 312 thereby forms an aperture through which the arriving optical communication signal 310 is received. An output side 322 forms an optical output, at least in part by action of the semi-reflective surface 306 to allow a portion of trapped optical signal energy from the interior 304 to emerge as an output optical signal, such as the output optical signal 320. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. In a particular example, an amplitude reflectivity of the first semi-reflective surface 308 may be $r_1 = 0.999$ and an amplitude reflectivity of the second semi-reflective surface 306 may be $r_2 = 0.985$. In other examples the reflectivity of each of the first and second semi-reflective surfaces may be different, and may be any suitable value for a particular implementation. The etalon 300 is one example of a suitable optical resonator in accord with aspects and embodiments described herein.

According to certain examples, an optical resonator, such as the etalon 300, will coherently develop an output signal based on the input signal, and maintain a given level of the output signal until a modulation in the phase of the input signal occurs. When a phase modulation occurs in the input signal, self-interference (constructive or destructive) may cause a phase-dependent change in the amplitude of the output signal. This can be seen in the input phase plot 330 and the output power plot 340 illustrated in FIG. 3. Accordingly, a received phase encoded optical communication signal, such as received optical signal 310, is converted to an amplitude varying signal, such as the output optical signal 320, by the optical resonator, such as the etalon 300. The output optical signal 320 is suitable for direct detection by a sensor, such as the OEC 242 of FIG. 2. Additionally, an optical resonator will function over a broad range of data rates without the need to modify the optical characteristics of the system, such as detector setup, path length adjustments, delay elements, or the like. For example, the ability of the etalon 300 to convert an arriving phase modulated input optical signal 310 into an intensity modulated output optical signal 320 may be independent of the modulation rate at which the input phase is changing, in some examples.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

FIG. 3 further illustrates operation of the etalon 300 with reference to the output power plot 340 of optical signal intensity (as output power) emerging from an optical resonator, such as the etalon 300, during a phase transition 332 in the received optical signal 310. At point 342 the etalon 300 is in a steady-state resonance condition wherein a steady intensity of light emerges. At point 344 a phase transition 332 occurs in the arriving optical signal 310, temporarily disrupting the steady-state and causing a change in the emerging light intensity. During successive reflections inside the etalon, labeled at point 346, resonance is being re-established and the emerging light intensity increases until, at point 348, a steady intensity of light emerges when the etalon 300 has returned to a steady-state condition.

Accordingly, variation in emerging light intensity from an optical resonator, such as the etalon 300 or a micro-ring, indicates that a transition occurred in an arriving optical signal, such as a phase, frequency, or amplitude variation, and such may be used by appropriate signal processing to determine useful information by analyzing the emerging light intensity. In the example discussed above and illustrated by FIG. 3, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an etalon tuned to the arriving wavelength reacts to a phase variation in the arriving optical signal in accord with the discussion above and as illustrated in FIG. 3. If the arriving optical signal is modulated with binary phase shift keying (BPSK), for example, the output illustrated in FIG. 3 indicates each phase shift, and accordingly the information carried in the phase shift keying may be recovered from the intensity variations at the output optical signal 320. It should be understood by those of skill in the art with the benefit of this disclosure, that such information recovery is achieved without the necessity for a local coherent clock source to demodulate the arriving optical signal.

Figure 4:
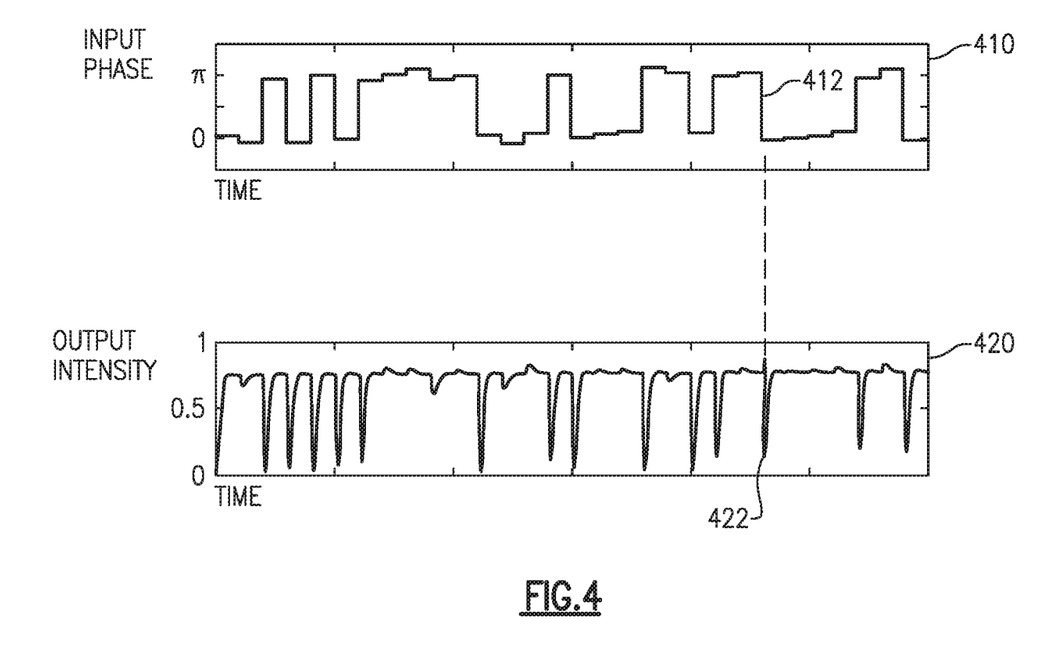
FIG. 4 is a graph of optical input phase and output intensity from an example of the optical resonator of FIG. 3.

FIG. 4 illustrates a plot 410 of varying phase of a received phase modulated optical signal, and a plot 420 of the resulting intensity of an output optical signal, from an optical resonator such as the etalon 300. The results shown in FIG. 4 are for an etalon having a length of 18 μm and with reflectance of 0.999 at the semi-reflective surface 308 and reflectance of 0.985 at the semi-reflective surface 306. The otherwise continuous input phase (shown in the plot 410) changes at intervals according to the modulated information content, and the plot 410 can be seen as a sequence of binary data, such as high and low bits corresponding to ones and zeros, for example. Among the multiple phase transitions shown in the plot 410, a phase transition 412 is specifically associated with a change 422 in output intensity, shown in the plot 420. Each phase variation in the received optical signal causes a respective change in the output intensity. Accordingly, a receiver can track the changes in output intensity and thereby recover the information content of the received phase modulated optical signal.

Optical resonators, such as etalons and micro-rings, used to demodulate or convert optical signal modulations into intensity modulated output signals, as discussed herein, can operate on numerous wavelengths simultaneously. Optical resonators may therefore convert modulations of multiple wavelength signals, in one resonator, for systems using, e.g., wavelength division multiplexing (WDM), including course WDM and dense WDM, or others. For example, one or more optical resonators may act on arriving WDM signals prior to the WDM signals being separated into their various wavelengths. Phase or other variations in any number of incident wavelengths can be simultaneously detected and converted into output intensity modulations of each respective wavelength.

Figure 5A:
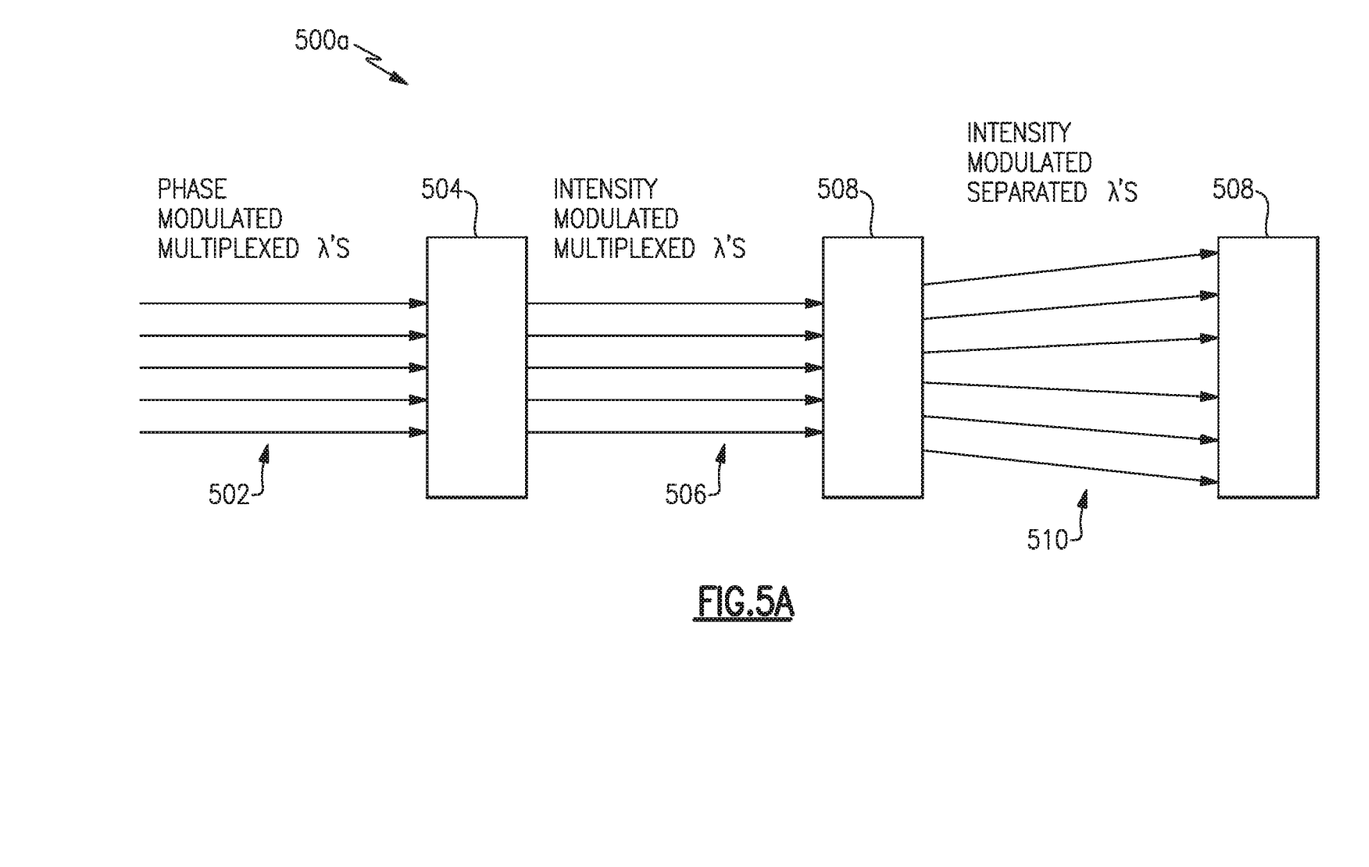
FIG. 5A is a schematic diagram of an example of an optical resonator in operation to act on multiple wavelengths, each of which are separable from the others.

FIG. 5A illustrates an example of a portion 500a of a receiver system. Multiple wavelengths of light 502 enter an etalon 504. The etalon 504 includes a resonate cavity that accumulates energy from each of the incident wavelengths 502. The etalon 504 is a linear device and therefore does not cause any mixing or heterodyning of the individual wavelengths 502. The various wavelengths 502 of light individually interact with the etalon 504 as discussed above, such that each of the wavelengths 502 emerges from the etalon 504 as intensity modulated optical signals 506. A wavelength-based optical splitter 508 then separates the light into its individual wavelengths to provide separated intensity modulated optical signals 510, each of their own wavelength. Each of the wavelengths of the separated intensity modulated optical signals 510 may be received by a detector 512, such as an optical-electrical converter, to convert each wavelength into, e.g., an electrical signal. In some examples, the detector 512 may be a detector array, which may include a number of photodetectors Each of the output electrical signals from the detector 512 include amplitude variations indicative of the modulation variations of one of the wavelengths of light, as discussed previously, e.g., with respect to FIG. 2. For example, when in a steady state mode the light exiting the etalon 504 has a constant intensity at each wavelength. When a phase variation occurs in light of a particular wavelength, the intensity of that wavelength exiting the etalon 504 is temporarily changed (e.g., increased, decreased) by an amount relative to the amount of phase variation. The respective detector 512 that converts the particular wavelength generates an electrical signal whose amplitude is temporarily changed in accord with the temporary change in light intensity.

In some examples a different optical resonator may be used instead of the etalon 504. For instance, a micro-ring may be used, as previously discussed, as an optical resonator without departing from the example portion 500a shown in FIG. 5A. Additionally, the optical splitter 508 that separates light by various wavelengths may be any of various optical or photonic devices, such a simple prism. In some examples, the splitter 508 may be an arrayed waveguide grating (AWG).

Figure 5B:
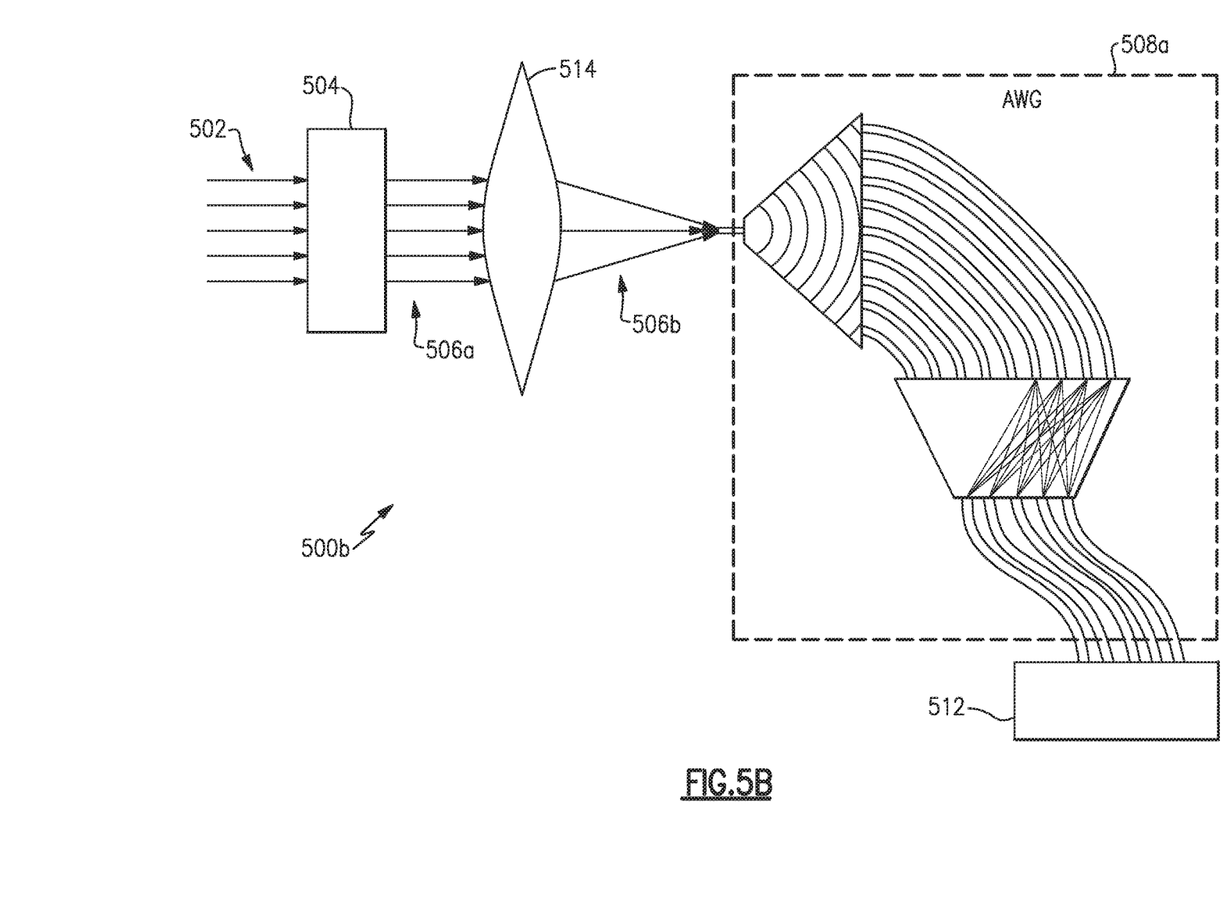
FIG. 5B is a schematic diagram of another example of an optical resonator in operation to act on multiple wavelengths, each of which are separable from the others.

FIG. 5B illustrates another example of a portion 500b of a receiver system, similar to the portion 500a of FIG. 5A. The portion 500b includes an arrayed waveguide grating 508a to separate light into its various wavelengths. In some examples, the arrayed waveguide grating 508a may have an optical fiber interface. In the example of FIG. 5B, the arriving light 502 may arrive from free space, and the intensity modulated emitted light 506a from the etalon 504 may pass through a focusing element 514, such as a lens, to focus the light 506b into the optical fiber interface. In other examples, the arriving light 502 may arrive on an optical fiber, and the etalon 504 may be in-line between the arriving optical fiber and the optical fiber interface, such that converted intensity modulated light 506a directly enters the optical fiber interface. In some examples, the arrayed waveguide grating 508 may be fiber coupled to the various detectors 612

As discussed above, each of multiple wavelengths of light can interact with an optical resonator, such as an etalon or micro-ring, independently of the other wavelengths of light. For a particular wavelength of light, a maximum steady-state output occurs when the optical resonator is of a dimension to cause resonance for the particular wavelength. Accordingly, an optimum operating condition may exist for particular wavelengths of light that resonate. Additionally, an optical resonator may cause or create optical resonance at multiple wavelengths. For example, an etalon of physical length, L, will have resonance for wavelengths that are integer multiples of twice the length, 2 L. It should be noted that in this example, the wavelength is that according to the material from which the interior of the etalon is made. Accordingly, an optimum operating condition may exist in a WDM system when the set of wavelengths are selected to be among the resonant wavelengths of the resonator. In various examples, optical resonators may be designed and manufactured, of varying dimensions, to accommodate particular sets of desired wavelengths for a WDM system. Additionally, in some examples, an optical resonator may be tunable and/or further tuned after manufacture by, for example, positioning at various angles relative to the arriving light, or including various features that may allow for variable tuning, such as piezo-electric or other materials to allow adjustment of various dimension(s) by, e.g., electrical signals.

In addition to multiple wavelengths interacting independent of each other, various polarizations of each wavelength also behave independently of each other within various optical resonators. Accordingly, an optical system according to those described herein may accommodate various modulation schemes on various polarizations of various wavelengths. For reference, polarization is generally defined with respect to the direction of the electric field in an optical signal.

Figure 6:
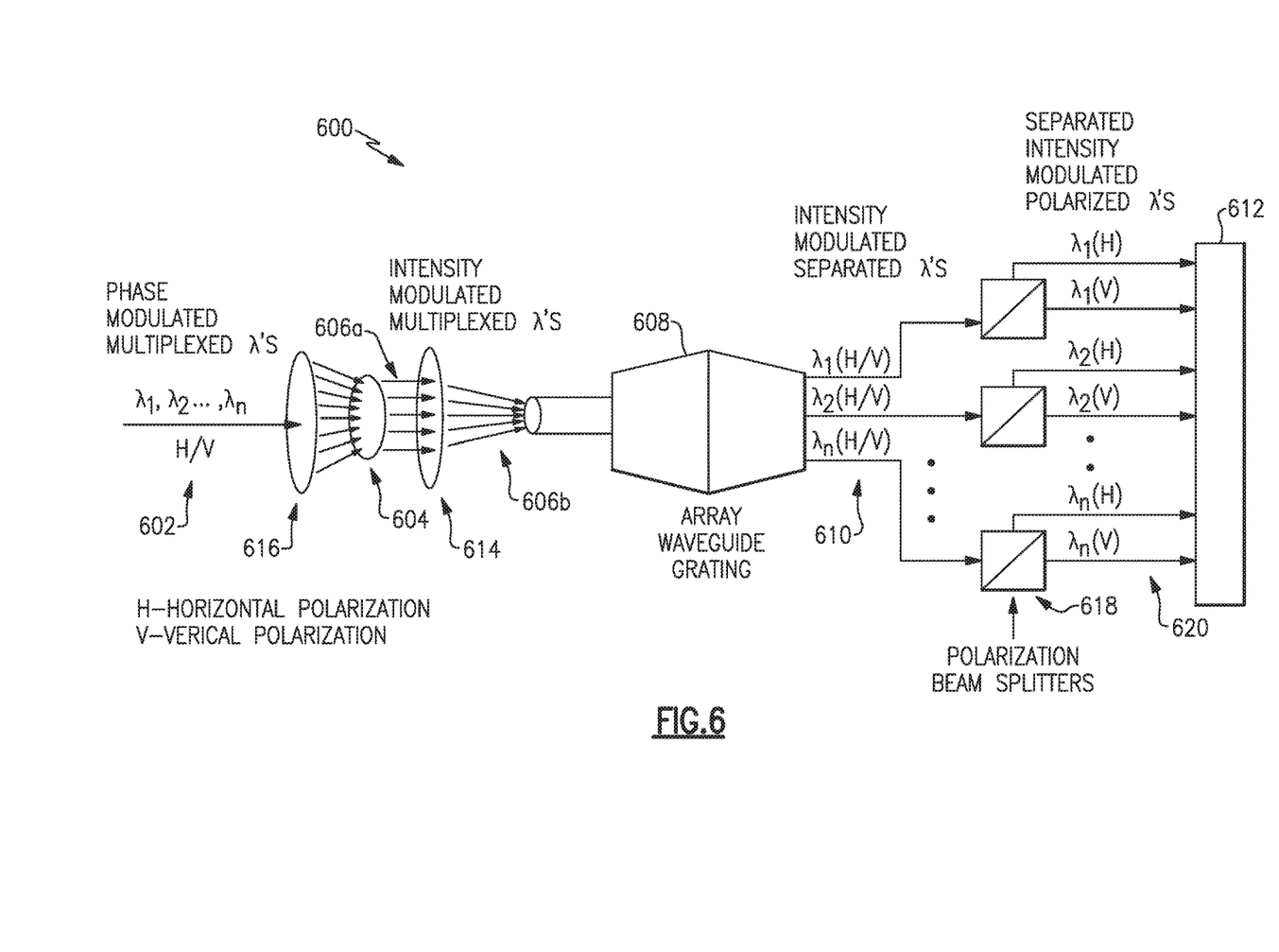
FIG. 6 is a schematic diagram of an example of an optical resonator in operation to act on multiple wavelengths, each of which are separable from the others and into distinct polarizations.

FIG. 6 illustrates a WDM receiver portion 600 to receive multiple polarized signals on one or more wavelength. Arriving light 602 contains multiple wavelengths, each with potentially multiple orthogonal polarizations, such as horizontal (H) and vertical (V). Each wavelength-polarization combination may have any of various modulation schemes associated with it. In some examples, the arriving light 602 may pass through various optics 616 and be directed to an optical resonator, such as the etalon 604. Each wavelength-polarization combination of the light 606a emitted from the etalon 604 includes variations in intensity that are representative of the various modulation transitions. More particularly, the electric field for each wavelength approaches or achieves a steady state intensity at the output of the etalon 604 independent of the electric fields of other wavelengths. Phase or other modulations in one or more of the incident electric fields, cause the output intensity to vary, for each of the affected electric fields. Orientation of the electric fields, i.e., polarization, is not altered by the etalon 604.

The emitted light 606a may pass through additional optics 614, for example to provide focused light 606b to enter a waveguide grating 608 (such as an arrayed waveguide grating, for example) that separates the individual wavelengths and provides each wavelength of light 610 as an input to one or more polarization beam splitters 618. Each polarization beam splitter 618 separates a respective wavelength into horizontal and vertical components, thereby providing two optical signals 620 for each wavelength of light 610. One or more detectors 612, e.g., an array of photodetectors, for example, may convert each wavelength separates polarized optical signal 620 into an electrical signal for further processing.

In some examples, the waveguide grating 608 may be fiber coupled to the polarization beam splitters 618. Additionally, outputs of the polarization beam splitters 618 may be fiber coupled to the various detectors 612. In some examples, not all wavelengths have multiple polarizations, and polarization beam splitters may be omitted for wavelengths having only a single polarization. In some examples, not all wavelengths for which the etalon 604 (or other optical resonator) provides resonance will be in use.

Figure 7:
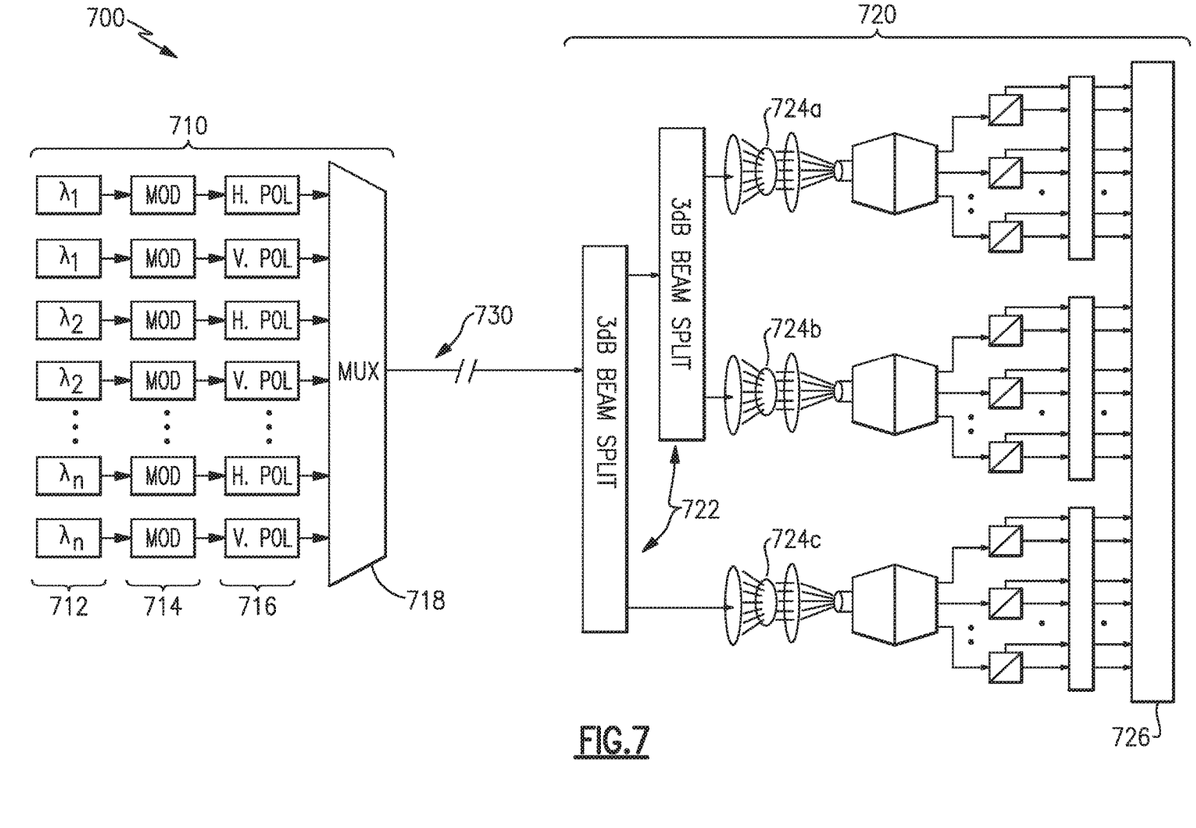
FIG. 7 is a schematic diagram of an example of a multi-wavelength multi-polarization communication system utilizing an optical resonator as a receiver component.

FIG. 7 illustrates an example of a WDM system 700 including a transmit portion 710 and a receive portion 720 coupled by a communication channel 730. The transmit portion 710 includes a number of optical sources 712, such as lasers, to produce optical signals of varying wavelengths. The output of each optical source is modulated by one of multiple modulators 714 according to various data streams (e.g., communication data) and may be polarized by one of multiple polarizers 716. The various optical signals are multiplexed together by a multiplexer 718 to become a WDM signal (e.g., an optical signal having multiple wavelengths carrying different information) sent on the channel 730. Because the various polarized wavelengths do not interfere with each other, the multiplexer 718 may be, in some examples, an optical combiner or a lens to focus the various optical signals for coupling into, e.g., a fiber optic cable. Accordingly, the channel 730 may be a fiber optic cable in some examples. In some examples, the channel may include a free space medium.

The receive portion 720 may include numerous instances of, e.g., receiver portions 600 of FIG. 6. Beam splitters 722 may distribute the arriving light from the channel 730 to multiple such receiver portions, and each may have a different arrangement of optical resonator(s) 724. In some examples, only a single receiver portion may be required. In other examples multiple receiver portions having different arrangements of optical resonator(s) 724 may be provided, as shown in FIG. 7. For example, the optical resonator 724a may be designed and/or tuned to receive a subset of the transmitted wavelengths while the optical resonator 724b may be designed and/or tuned to receive a different set of the transmitted wavelengths. Additionally or alternately, differing optical resonators 724 may be designed to work with differing modulation schemes. For example, the optical resonator 724a may be designed (e.g., optimized) for Binary Phase Shift Keying (BPSK) modulation, while the optical resonator 724*b* may be designed for Quadratue Phase Shift Keying (QPSK), and the optical resonator 724*c* may be designed for Quadrature Amplitude Modulation (QAM) of varying constellations. In some examples, any of the optical resonators 724*a*, 724*b*, 724*c* may include a plurality of optical resonators, to accommodate higher order modulation schemes, for example. As in FIG. 6, the receiver portion 720 may include detectors to output amplitude modulated electrical signals, the amplitude modulations of any one of the electrical signals being representative of the modulation of the particular wavelength and polarization with which it is associated. The electrical signals are provided to further receiving component(s) 726 to interpret the amplitude variations to recover information conveyed by the modulated polarized optical signals generated at the transmit portion 710.

It should be appreciated that the various disruptions to output intensity caused by modulation of an arriving light signal may vary with physical dimensions of an optical resonator, such as the dimensional length of an etalon or micro-ring, e.g., the size of the etalon, and how accurately it is manufactured, e.g., how well tuned the etalon is to one or more wavelengths. Output intensity from an etalon with a smaller dimensional length is more quickly disrupted by a transition in the input signal, and more quickly re-establishes steady state after such a transition, relative to an etalon with a larger dimension. Additionally, an etalon manufactured to a more accurate tolerance, i.e., more accurately tuned to the particular wavelength (or set of wavelengths), provides a higher resonant output signal intensity at steady state and exhibits greater sensitivity to transitions in input signals, relative to an etalon manufactured to a less accurate tolerance.

Various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical signal, such as phase transitions associated with phase modulation, and how quickly the etalon approaches a return to steady-state after a transition. Additionally, various etalon dimensions and tolerances may be selected to optimize a receiver, such as the receiver 200, for a particular data rate and/or a particular wavelength.

Various dimensions of an optical resonator in accord with aspects and examples disclosed herein may be significantly smaller than a dimension associated with a baud rate or symbol length of a phase encoded optical signal. In some examples, a resonant dimension (e.g., etalon length, loop length of a micro-ring, etc.) may provide an effective optical length less than half the distance associated with a baud rate or symbol length. For example, a baud rate may be a rate at which modulation variations occur, and a symbol length may be the distance an optical signal travels between modulation variations. In the case of an optical resonator, the distance the optical signal travels may be based upon the material, or optical media, from which the optical resonator is constructed. For an optical resonator such as an etalon or micro-ring capable of storing optical signal energy and providing resonance through constructive and destructive interference, optical signal energy remains in the resonator for a greater amount of time such that an effective optical length is greater than the resonator's physical length, i.e., optical signal energy spends more time in the resonator than if the resonator allowed the optical signal to pass through without resonantly accumulating. Accordingly, a time until the next modulation variation (i.e., inverse of the baud rate) may be enough time for an arriving optical signal to traverse the resonant dimension of the optical resonator numerous times. In certain examples, the resonant dimension (etalon length, loop length) may provide an effective optical length one third or less of the symbol length. In some examples, the physical dimension of the etalon length or the loop length may be on the order of one tenth of the symbol length or less, (e.g., depending upon the reflectivity of the etalon surfaces, for example) to provide an effective optical length of one third of the symbol length. Accordingly, in some examples, a symbol length may be as short as 10 times the physical dimension of the etalon or loop length, or less. Additionally, the symbol length may be as long as 5,000 times the physical dimension of the etalon or loop length, or more, in accord with aspects and examples being capable of accommodating a wide variety of modulation rates as previously discussed.

Additional benefits associated with the use of an optical resonator, such as an etalon or micro-ring, as a front end component combined with a processing subsystem for the reception of modulated optical communication signals include flexible operation, capable of receiving signals from free space or via a fiber coupling or other optical waveguides and/or components. An optical resonator may also provide noise reduction due to rejection of optical signal energy outside the intended wavelengths, e.g., due to the resonate nature. Additionally, an optical resonator may be provided with coatings to or other features to further reject undesired optical wavelengths, including alternate resonant wavelengths that are not intended to be part of the received communication signal. For example, a particular length (or width, depending upon perspective) of an optical component may resonate at multiple wavelengths but coatings and/or other design features may act to limit the build-up of optical signal energy at the undesired wavelengths, such as a coating that provides reduced reflectivity at alternate wavelengths, or filters integrated with or placed before the aperture of the optical resonator, or others.

Additional modulation formats may also be accommodated by particular design characteristics of an optical resonator. The resonant nature may respond to pulse width or other modulations in addition to purely phase transitions. For example, a pulse width modulated signal causes the signal energy trapped in the resonator to build up or approach a steady-state value, and the longer the pulse width the closer the resonator will come to, or the longer it will remain in, a steady-state signal energy condition. When the pulse ceases, the optical resonator's output will change similar in manner to a phase transition. Accordingly, amplitude and pulse width modulations of an arriving optical signal may be detected by processing the optical intensity output of the optical resonator.

As discussed above with reference to FIGS. 1 and 2, in various examples components of the transmitter 100 and/or receiver 200 may be implemented as one of, or a combination of, analog circuitry, digital circuitry, or one or more digital signal processors (DSP) or other microprocessors executing software instructions. Software instructions may include DSP instructions.

Figure 8:
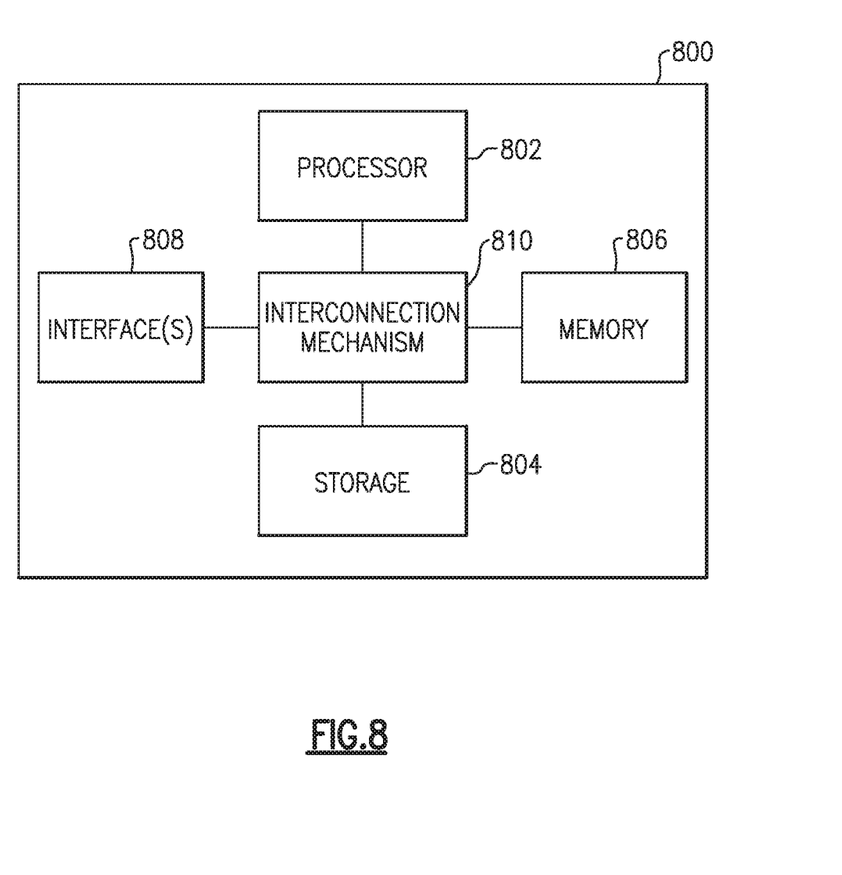
FIG. 8 is a functional block diagram of an example of a controller configured to implement various examples of the processes described herein.

FIG. 8 illustrates one example of a control circuit (e.g., a controller 800) that may implement software routines corresponding to various components of a transmission system, such as illustrated in FIG. 1, and/or other components. The controller 800 may further implement software routines corresponding to components of a receiver, such as the digital processing subsystem 250 of FIG. 2 and/or other components of a receiver 200. The controller 800 may include a processor 802, a data store 804, a memory 806, and one or more interfaces 808, such as a system interface and/or a user interface. While not explicitly illustrated in FIG. 8, in certain examples the controller 800 may be coupled to a power source. The power source may deliver power to one or more components of the controller 800, as well as other components of the optical transmitter 100 or optical receiver 200.

In FIG. 8, the processor 802 is coupled to the data storage 804, memory 806, and the various interfaces 808. The memory 806 stores programs (e.g., sequences of instructions coded to be executable by the processor 802) and data during operation of the controller 800. Thus, the memory 806 may be a relatively high performance, volatile, random access memory such as a dynamic random access memory ("DRAM") or static memory ("SRAM"). However, the memory 806 may include any device for storing data, such as a disk drive or other nonvolatile storage device. Various examples may organize the memory 806 into particularized and, in some cases, unique structures to perform the functions disclosed herein. These data structures may be sized and organized to store values for particular data and types of data.

The data storage 804 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 802 to perform any of the functions described herein.

In various examples, the controller 800 includes several interface components 808, such as a system interface and/or a user interface. Each of the interface components 808 is configured to exchange, e.g., send or receive, data with other components of the controller 800 (and/or associated transmitter or receiver), or other devices in communication with the controller 800. According to various examples, the interface components 808 may include hardware components, software components, or a combination of hardware and software components.

In certain examples, components of the system interface couples the processor 802 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the controller 800 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the controller 800. Data received at the various interfaces may be provided to the processor 802, as illustrated in FIG. 8. Communication coupling (e.g., shown interconnection mechanism 810) between the processor 802, memory 806, data storage 804, and interface(s) 808 may be implemented as one or more physical busses in conformance with standard, proprietary, or specialized computing bus technologies.

The processor 802 performs a series of instructions that result in manipulated data that is stored in and retrieved from the data storage 804, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 802 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 802 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
an optical resonator having an aperture to allow optical signal energy to enter and an output to allow a portion of optical signal energy to be emitted, the optical resonator configured to receive optical signal energy of a plurality of wavelengths via the aperture, accumulate resonant optical signal energy inside the optical resonator, cause the emitted optical signal energy at each of the plurality of wavelengths to approach a steady-state output intensity, and disturb the emitted optical signal energy of a respective wavelength upon a transition in the received optical signal energy of the respective wavelength, the optical resonator having at least one dimension to cause phase alignment of the accumulated optical signal energy at each of the plurality of wavelengths;
an optical splitter configured to receive the emitted optical signal energy and separate the emitted optical signal energy into each of the plurality of wavelengths; and
a detector configured to receive at least one of the plurality of wavelengths and to detect the disturbance to the emitted optical signal energy and determine a characteristic of the transition in the received optical signal energy based upon the disturbance.

2. The optical signal receiver of claim 1 wherein the optical resonator is further configured to disturb the emitted optical signal energy based upon a phase variation in the received optical signal energy.

3. The optical signal receiver of claim 1 wherein the disturbance is a variation in intensity of the emitted optical signal energy and the detector is further configured to detect the variation and to determine a phase transition in the received optical signal energy based upon the variation.

4. The optical signal receiver of claim 1 wherein the optical resonator is an etalon having two semi-reflective surfaces configured to at least partially trap optical signal energy by reflecting a portion of optical signal energy impinging upon each of the semi-reflective surfaces.

5. The optical signal receiver of claim 1 wherein the optical resonator includes first and second reflective surfaces, substantially parallel with each other, with reflective sides facing each other, the first reflective surface forming at least a portion of the aperture and being partially transmissive to optical signal energy arriving from outside the optical resonator to allow optical signal energy into the optical resonator, the second reflective surface forming at least a portion of the output and being substantially reflective but partially transmissive to optical signal energy inside the optical resonator to allow the portion of the optical signal energy inside the optical resonator to be emitted outside the optical resonator.

6. The optical signal receiver of claim 1 further comprising an optical-electrical converter configured to convert the emitted optical signal energy into an electrical signal, the electrical signal having an amplitude indicative of an intensity of the emitted optical signal energy, and the detector configured to detect the disturbance to the emitted optical signal energy by processing the electrical signal.

7. A method of detecting information encoded in an optical signal, the method comprising:
receiving optical signal energy of a plurality of wavelengths;
accumulating the optical signal energy in an optical resonator that approaches a steady state of accumulated optical signal energy;
outputting optical signal energy from the accumulated optical signal energy, the intensity of the output optical signal energy at a respective wavelength of the plurality of wavelengths being proportional to the accumulated optical signal energy of the respective wavelength;
detecting the output optical signal energy of at least one of the plurality of wavelengths; and
determining a modulation characteristic of the received optical signal energy based on the detected output optical signal energy.

8. The method of claim 7 wherein determining a modulation characteristic of the received optical signal energy based on the detected output optical signal energy includes determining a phase variation in the received optical signal energy based on an intensity variation in the output optical signal energy.

9. The method of claim 7 further comprising varying the accumulated optical signal energy in the optical resonator by one of destructive interference or constructive interference within the optical resonator in response to the modulation characteristic of the received optical signal energy.

10. The method of claim 9 wherein the modulation characteristic of the received optical signal energy is a phase transition associated with the respective wavelength.

11. The method of claim 7 wherein accumulating the optical signal energy in an optical resonator includes partially reflecting the optical signal energy between two semi-reflective surfaces.

12. The method of claim 7 further comprising converting the output optical signal energy into an electrical signal, the amplitude of the electrical signal being representative of the intensity of the output optical signal energy.

13. The method of claim 12 wherein determining a modulation characteristic of the received optical signal energy based on the detected output optical signal energy includes providing the electrical signal to a receiver.

14. An optical receiver comprising:
an etalon configured to at least partially accumulate optical signal energy of a plurality of wavelengths between two semi-reflective surfaces and having an aperture to allow optical signal energy to enter and an output to allow a portion of the accumulated optical signal energy to be emitted, the etalon configured to cause the output optical signal energy to temporarily vary in intensity based upon a phase transition in the entering optical signal energy;
an optical-electrical converter configured to receive at least one wavelength of the output optical signal energy and to convert the received output optical signal energy into an electrical signal; and
a receiver configured to receive the electrical signal and to determine encoded information based in part on the electrical signal.

15. The optical receiver of claim 14 further comprising an analog to digital converter configured to convert the electrical signal from an analog form to a digital form, the receiver configured to receive the digital form of the electrical signal.

16. The optical receiver of claim 14 further comprising an optical splitter configured to receive the output optical signal energy and separate the output optical signal energy into each of the plurality of wavelengths.

17. The optical receiver of claim 16 wherein the optical splitter is an arrayed waveguide grating.

18. The optical receiver of claim 14 wherein the etalon is configured to have a nominal dimension selected to cause the etalon to at least partially accumulate optical signal energy of the plurality of wavelengths.

19. The optical receiver of claim 14 wherein the etalon is configured to have a nominal dimension selected to cause the accumulation of optical signal energy to occur at a particular rate to accommodate an expected data rate associated with the encoded information.

20. The optical receiver of claim 14 further comprising optics configured to collect optical signal energy and provide the optical signal energy to the etalon.

* * * * *